United States Patent

[11] 3,574,440

| [72] | Inventors | Fritz Dertina;<br>Fritz Gabler, Vienna; Roland Mitsche, Loeben, Austria |
|---|---|---|
| [21] | Appl. No. | 866,838 |
| [22] | Filed | Sept. 17, 1969 |
| [45] | Patented | Apr. 13, 1971 |
| [73] | Assignee | C. Reichert Optische Werke A.G.<br>Vienna, Austria |
| [32] | Priority | Oct. 29, 1965 |
| [33] | | Austria |
| [31] | | A9792/65 |
| | | Continuation of application Ser. No. 589,957, Oct. 27, 1966, now abandoned. |

[54] INCIDENT LIGHT MICROSCOPE WITH ROTATABLE HOUSING
7 Claims, 1 Drawing Fig.

[52] U.S. Cl. .................................................. 350/91,
350/18, 350/49
[51] Int. Cl. .................................................. G02b 21/06
[50] Field of Search .......................................... 350/18, 30,
34, 37, 80—91, 49; 240/(Inquired)

[56] References Cited
UNITED STATES PATENTS

| 1,987,776 | 1/1935 | Hauser ........................ | 350/85X |
| 1,996,920 | 4/1935 | Hauser ........................ | 350/91 |
| 2,737,080 | 3/1956 | Mottu.......................... | 350/87X |
| 2,977,848 | 4/1961 | Malfeld ....................... | 350/87 |

FOREIGN PATENTS

| 758,192 | 7/1949 | Germany..................... | 350/90 |

Primary Examiner—David Schonberg
Assistant Examiner—T. H. Kusmer
Attorney—Michael S. Striker ABSTRACT: An incident light microscope permitting to view an object either from above or from below, in which the light source, the objective carrier and the elements for illuminating the object form a single unit which is turnable about an axis arranged parallel to and between a pair of support faces adapted to support an object to be viewed in the microscope and in which this axis coincides with the optical axis of part of the path of the viewing and part of the path of the illuminating rays.

PATENTED APR 13 1971
3,574,440
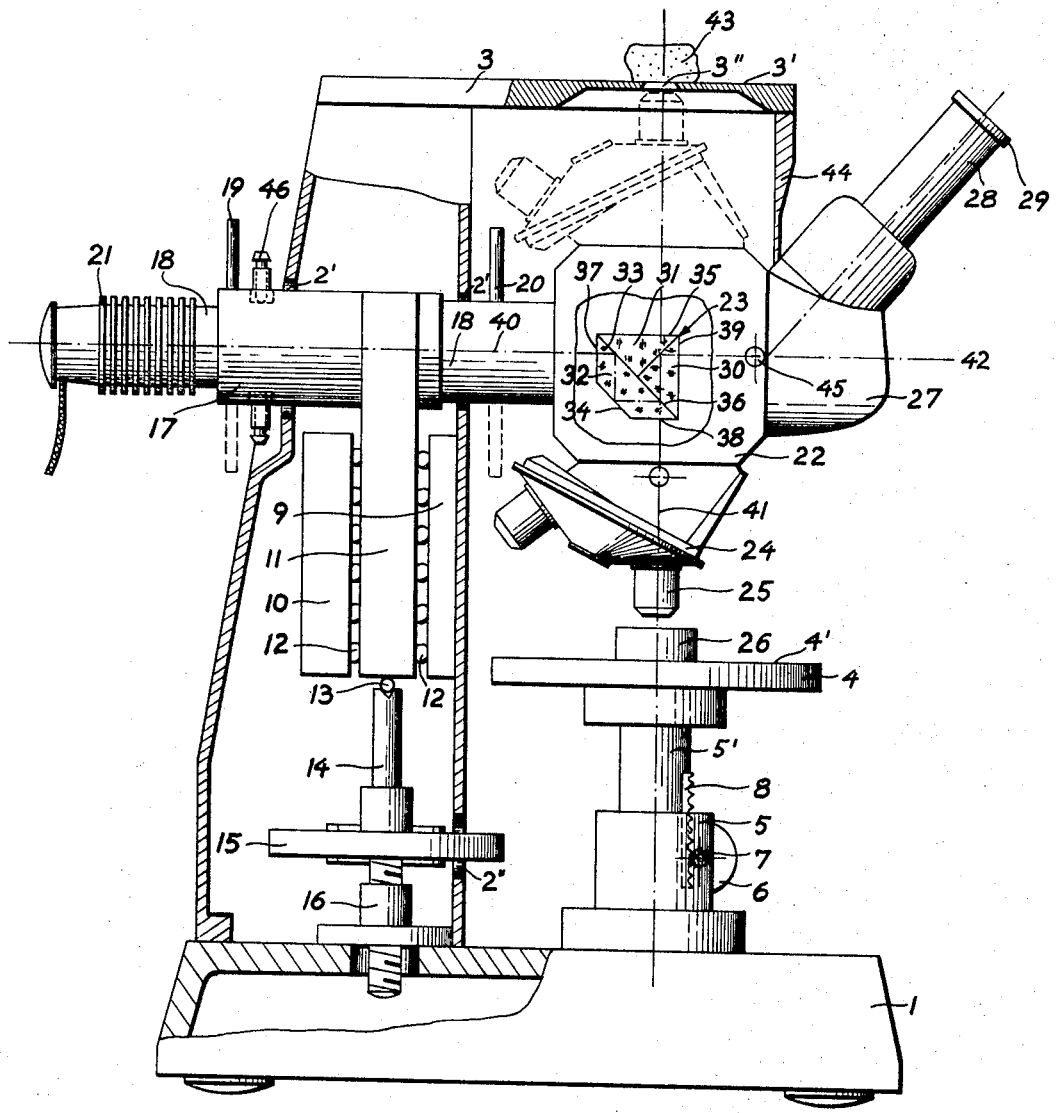
INVENTORS
Fritz Bertram
Fritz Gabler
Roland Mitsche
BY
Michael S. Striker
ATTORNEY

INCIDENT LIGHT MICROSCOPE WITH ROTATABLE HOUSING

This application is a continuation application of application Ser. No. 589,957, filed Oct. 27, 1966, now abandoned.

The present invention relates to an incident light microscope.

Incident light microscopes are commonly constructed to permit viewing of an object either from above or from below through an opening in the microscope table on which the object is placed. Both constructions have certain advantages and disadvantages depending on the nature of the object to be viewed in the microscope.

It was therefore desirable to construct microscopes which selectively permit to view an object either from above or below. Microscopes of this type are known in the art which include two parallel plates for supporting an object thereon and in which an objective carrier is arranged between the plates turnably surrounding a part of the light rays passing from a light source through the objective onto the object to be viewed in the microscope and from there into the ocular of the microscope, in which the elements serving to illuminate the objective are turnable independent from the objective carrier about the aforementioned part of the light rays, and whereby the aforementioned elements in turn are surrounded by the objective carrier. Such microscopes are complicated in construction and require for the change over from one to the other way of viewing the object a series of successive adjusting operations, which makes such a change over a complicated task and which leads sometimes also to an improper adjustment of the microscope.

It is an object of the present invention to provide for an incident light microscope which permits viewing of an object either from above or below and which can be adjusted for either viewing operation in a simple and efficient manner so that improper adjustments will be avoided.

It is a further object of the present invention to provide for an incident light microscope of the aforementioned type, which is constructed of relatively few and simple parts so that the microscope may be manufactured at reasonable cost and will stand up trouble-free during extended use.

With these objects in view, the incident light microscope according to the present invention mainly comprises support means, an upper and a lower plate carried by the support means spaced from each other and each having a substantially horizontal support face parallel to the support face of the other plate and adapted to support an object to be viewed in the microscope, ocular means, an objective carrier, at least one objective carried by the objective carrier, a light source, reflecting means for reflecting light from the light source through the objective onto an object located on one of the plates and light reflected from the object into the ocular means, housing means carrying the light source, the reflecting means and the objective carrier and forming with these elements one unit, and carrier means mounted on the support means and carrying the aforementioned unit turnably about a turning axis located between and parallel to said support faces, the aforementioned turning axis coinciding with the optical axis of the light rays passing from the light source to the reflecting means and part of the optical axis of the light rays passing from the reflecting means to the ocular means.

The microscope preferably includes also rough adjusting means connected to the lower plate for moving the latter in a direction normal to the support face thereof. Preferably the microscope includes further fine adjusting means connected to the carrier means for moving the latter and the elements carried thereby in a direction normal to the aforementioned support faces.

It is also advantageous to provide the microscope with arresting means cooperating with said housing means for selectively arresting the latter in either of two through 180° turned positions in which the optical axis of the objective carried by the objective carrier connected to the housing means is normal to the aforementioned support faces.

The ocular means are preferably also carried on the housing means but movable relative thereto about the aforementioned turning axis and the microscope includes preferably also stationary means connected to the support means and engaging the ocular means for maintaining the latter stationary during turning of the housing about the turning axis.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which: the single FIGURE is a partially sectioned side view of the microscope according to the present invention.

Referring now to the drawing, it will be seen that the microscope according to the present invention comprises support means which may include a base plate 1 and an upright hollow standard 2 projecting upwardly from the top face of the base plate in the region of one end of the latter and connected thereto in any convenient manner. An upper plate 3 is fixedly connected in any convenient manner to the upper end of the standard 2 projecting laterally therefrom and the upper plate has an upper supporting face 3' adapted to support an object thereon over an opening 3'' formed in a lateral portion of the plate 3. A lower plate 4 having an upper support face 4' parallel to the support face 3' of the upper plate, is arranged movable toward and away from the upper plate by means of rough adjusting means including a guide cylinder 5 mounted on the base plate 1 laterally of the standard in which a guide rod 5' carrying at the upper end thereof the plate 4 is slidably arranged, vertically adjustable by means of a rack 8 fixed to the rod 5' and meshing with a pinion 7 turnably mounted in the guide cylinder 5 and connected to a knob 6 to be manually rotated thereby.

Housing means including a tube 18 extending through aligned openings 2' in an upper portion of the standard 2 and a hollow microscope head 22 located between the upper and the lower plates 3 and 4 and fixedly connected to right end, as viewed in the drawing, of the tube 18, are mounted on carrier means including a sleeve 17 surrounding a left portion of the tube 18 and an elongated member 11 fixedly connected to the sleeve 17 and projecting downwardly therefrom substantially normal to the axis thereof. The carrier means 11, 17 are guided for movement in vertical direction by guide means including two members 9 and 10 fixed to the standard 2 and arranged spaced from opposite sides of the elongated member and substantially parallel thereto and a plurality of balls 12 located in V-grooves formed in the members 9 and 10 and rollingly engaging opposite faces of the member 11.

Fine adjusting means are provided for moving the carrier means and the elements carried thereby in substantially vertical direction, that is in a direction normal to the planes in which the supporting faces 3' and 4' are located. The fine adjusting means may include a spindle 14 provided at a lower portion thereof with a fine screw thread engaged with a corresponding thread in a nut 16 fixed to the upper surface of the base plate 1. A wheel 15 preferably provided with a knurled peripheral surface is coaxially fixed to the spindle 14 intermediate the ends thereof and the wheel 15 projects with a portion thereof through an additional opening 2'' in the wall of the standard 2 to the outside of the latter so that the spindle 14 may be turned manually about its axis to raise or lower the same. A ball 13 located in a central cavity at the upper end of the spindle 14 engages the bottom end of the member 11 so that the latter will follow movement of the spindle 14.

Illuminating lenses, not shown in the drawing are located in the tube 18 which also carries in the interior thereof a field iris diaphragm, likewise not shown, and adjustable by a lever 19, and an aperture iris diaphragm (not shown) and adjustable by a lever 20. A light source 21, including a housing provided with cooling ribs and in the interior of which a low voltage incandescent lamp and a (not shown in the drawing) are provided, is inserted in the left end, as viewed in the drawing, of the tube 18 and an objective carrier 24 is turnably mounted on the microscope head 22 connected to the other end of the tube 18. The objective carrier 24 preferably carries two objectives 25 and the objective carrier 24 is turnably mounted on the microscope head 22 in such a manner that the optical axis of either objective may be selectively aligned in direction normal to the axis of the tube 18. Located in the interior of the microscope head 22 and connected thereto in any convenient manner, not shown in the drawing, are reflecting means 23 arranged and constructed in such a manner that the light emanating from the light source 21 is reflected either on the upper plate 3 or the lower plate 4. In the position of the various elements illustrated in full lines in the drawing the light emanating from the light source will be reflected by the reflecting means 23 through the objective 25 located in working position onto an object 26 located on the supporting surface 4' of the lower plate 4. The light rays reflected from the object 26 will pass through the objective 25 to be reflected by the reflecting means 23 into the tubus 27 carried by the microscope head 22, respectively into the inclined viewing tube 28 which carries at the outer end thereof an ocular 29. The tubus 27 is by means of nonillustrated releasable connecting means of known construction connected to the right end, as viewed in the drawing of the microscope head 22 and clamped thereon by means of a screw 45 so that an easy exchange from a monocular to a binocular viewing or vice versa can be carried out. It is also possible to connect to connect to the same portion of the microscope head 22 connecting members not shown in the drawing which permit mounting of a miniature camera.

The reflecting means 23 comprise three prisms cemented to each other of which the prisms 30 and 31 have each a cross section in the form of a right angle triangle having two equal sides, whereas the third prism 32 is of trapezoidal cross section. The faces 33, 34 and 35 are mirror faces reflecting all the light rays impinging thereon, the face 36 is a partial mirror face reflecting part of the light impinging thereon while permitting part of the light passing therethrough, whereas the entrance and exit faces 37, 38 and 39 are not mirrored. The axis 40 of the bundle of light rays emanating from the light source 21 extends after being reflected three times in direction of the optical axis 41 of the objective 25 located in working position which coincides also with the optical axis of the image rays emanating from the objective. The axis of these image rays is after reflection on the completely mirrored face 35 reflected in the direction 42 and in the tubus 27 in such a manner that the axes 40 and 42 are aligned with each other.

The axis of the tube 18 coincides with the aforementioned axes 40 and 42 and the unit formed by the tube 18, the light source 21 carried on one end of the tube 18, the microscope head 22 with the reflecting means 23 therein, the objective carrier 24 and the objective carried thereby are turnable in the sleeve 17 about the forementioned axis.

When the various elements of the microscope are arranged as shown in full lines in the drawing, the lower plate 4 with the object 26 resting thereon is vertically adjusted by turning the knob 7 of the rough adjusting means for prefocusing the microscope. Subsequently thereto, the tube 18 and the elements carried thereby are raised or lowered through small distances by turning the wheel 15 and to thereby fine adjust the microscope. On the other hand, if it is desired to view an object 43 from below, then this object is placed with a ground surface onto the upper face 3' of the upper plate 3 with a part thereof extending over the opening 3'' in this plate and the unit comprising the tube 18, the light source 21 and the microscope head 22 carried by the tube 18 as well as the objective carrier 24 carried by the microscope head 22 are turned about the axis 40, 42 so that the objective carrier and the objective carried thereby will assume the position as shown in dotted lines in the drawing. In order to prevent the tubus 27 from turning with the aforementioned elements, stationary means are provided on the microscope and engaging the tubus for preventing turning of the same about the axis 40, 42 during turning of the aforementioned elements through an angle of 180°. The stationary means may include a tongue 44 fixed to and projecting downwardly from the right end, as viewed in the drawing, of the upper plate 3 and engaging the tubus 27 to prevent rotation of the latter about the axis 40, 42. Of course, before turning the aforementioned unit about the axis 40, 42 it is necessary to loosen the clamping screw 45 and this clamping screw is preferably tightened again after the aforementioned members are brought into the desired position. The various elements of the microscope are arranged in such a manner to each other that after turning of the microscope elements to the position as shown in dotted lines in the drawing a prefocusing is automatically obtained and only a fine adjustment by turning the wheel 15 is necessary. To avoid any interference of the various members of the microscope during the aforementioned turning operation, the fine adjustment is limited to a few tenths of a millimeter.

Arresting means are preferably also provided for arresting the tube 18 and the elements carried thereby in either of two through 180° angularly displaced positions and in such a manner that in each of these positions the axis 41 is exactly normal to the supporting surfaces 3' and 4'. The arresting means preferably comprise an arresting pin 46 carried by the sleeve 17 movable in direction normal to the axis of the sleeve and cooperating at the inner end thereof with either of two through 180° displaced cavities in the outer surface of the tube 18 to arrest the latter in either of the aforementioned two positions.

It will be understood that each of the elements described above, or two or more together, may also find a useful application in other types of incident light microscopes differing from the types described above.

While the invention has been illustrated and described as embodied incident in a light microscope in which an object may be viewed either from above or from below, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. An incident light microscope comprising, in combination, support means; an upper and a lower plate carried spaced from each other by said support means and each having a substantially horizontal support face parallel to the support face of the other plate and adapted to support an object to be viewed in the microscope; ocular means; and objective carrier; at least one objective carried by said objective carrier; a light source; reflecting means for reflecting light from said light source through said objective onto an object located on one of said plates and light reflected from said object into said ocular means; housing means carrying said light source, said reflecting means and said objective carrier and forming with these elements one unit; carrier means mounted on said support means and carrying said unit turnably about a turning axis located between and parallel to said support faces, said turning axis coinciding with the optical axis of the light rays passing from said light source to said reflecting means and part of the optical axis of the light rays passing from said reflecting means to said ocular means; and means mounting said ocular means turnably about said optical axis on said housing means so that said unit including said housing means can be turned about said turning axis while said ocular means is prevented from turning together with said housing means.

2. An incident light microscope as defined in claim 1, wherein said upper plate is fixedly mounted on said support means, and including adjusting means connected to said lower plate for moving the latter in a direction normal to said support face thereof.

3. An incident light microscope as defined in claim 2, wherein said adjusting means for said lower plate are rough adjusting means, and including fine adjusting means cooperating with said carrier means for moving the latter and said unit carried thereby in a direction normal to said support faces.

4. An incident light microscope as defined in claim 2, wherein said carrier means include an elongated member carrying said housing means turnably about said turning axis and guide means guiding said member movable in a direction normal to said support faces; and fine adjusting means mounted on said support means and cooperating with said elongated member for moving the same along said guide means.

5. An incident light microscope as defined in claim 4, and including arresting means cooperating with said housing means for selectively arresting said housing means in either of two through 180° turned positions in which the optical axis of said objective is normal to said support faces.

6. An incident light microscope as defined in claim 5, wherein said carrier means include a sleeve coaxially with and surrounding part of said housing means, said elongated member being fixed and projecting downwardly from said sleeve.

7. An incident light microscope as defined in claim 5, wherein said ocular means comprises a tubus connected at one end thereof to one end of said housing means turnably about said turning axis and projecting upwardly inclined to said axis therefrom, and an ocular mounted on the other end of the tubus and including a stationary means connected to said support means and engaging said tubus for preventing turning of the latter during turning of said housing means about said turning axis.